United States Patent [19]

Schanze

[11] 4,454,162

[45] Jun. 12, 1984

[54] CONCENTRATE CONTAINING TRACE ELEMENTS SUITABLE FOR HUMAN BEINGS AND ANIMALS, A PROCESS FOR ITS PRODUCTION AND ITS USE

[76] Inventor: Rudolf Schanze, Friedenstr. 43, c/o G. Herrmann-Seidel, D-8034 Unterpfaffenhofen, Fed. Rep. of Germany

[21] Appl. No.: 320,018

[22] Filed: Nov. 10, 1981

[30] Foreign Application Priority Data

Nov. 14, 1980 [EP] European Pat. Off. ........ 80107054.1

[51] Int. Cl.$^3$ ............................................. A23K 1/00
[52] U.S. Cl. ..................................... 426/74; 426/623; 426/630; 426/658; 426/583; 426/807
[58] Field of Search .................. 426/2, 74, 805, 807, 426/658, 623, 630, 636, 583, 491, 658

[56] References Cited

U.S. PATENT DOCUMENTS

| | | | |
|---|---|---|---|
| 3,244,527 | 4/1966 | Baker | 426/74 X |
| 3,476,565 | 11/1969 | Anderson et al. | 426/74 |
| 3,563,758 | 2/1971 | Whiting et al. | 426/74 |
| 3,657,423 | 4/1972 | Yacowitz | 426/74 |
| 4,070,488 | 1/1978 | Davis | 426/74 |
| 4,112,123 | 9/1978 | Roberts | 426/74 |
| 4,126,703 | 11/1978 | Barnett | 426/74 |

FOREIGN PATENT DOCUMENTS 2034692  1/1972  Fed. Rep. of Germany ........ 426/74

OTHER PUBLICATIONS

Webb et al., "By-products from milk", Avi Publishing Co., 1970 (pp. 326-327 and 382-387).

*Primary Examiner*—R. B. Penland
*Attorney, Agent, or Firm*—Ostrolenk, Faber, Gerb & Soffen

[57] ABSTRACT

The invention relates to a process for the production of a concentrate containing trace elements suitable for human beings and animals, in which vegetable ash and-/or coal residues containing inorganic constituents are added to acid, liquid by-products from the processing of milk, trace elements and/or minerals are optionally introduced and the product obtained is dried. The product may then be ground or granulated.

The invention also relates to the concentrate obtained by this process and to a concentrate which, based on the dry mass, contains from 20 to 75 parts by weight of dry matter emanating from a liquid by-product from the processing of milk, from 8 to 55 parts by weight of vegetable ash and/or coal residues containing inorganic constituents, from 0 to 25 parts by weight of a mixture of trace elements, from 0 to 70 parts by weight of minerals and from 0 to 15 parts by weight of carbohydrates and/or gums.

6 Claims, No Drawings

CONCENTRATE CONTAINING TRACE ELEMENTS SUITABLE FOR HUMAN BEINGS AND ANIMALS, A PROCESS FOR ITS PRODUCTION AND ITS USE

BACKGROUND OF THE INVENTION

The invention relates to a process for the production of a concentrate or nutrient containing trace elements which is suitable for human beings and animals and which may be directly consumed as such. However, it is preferably used as a food supplement or feed supplement or as an additive for medicaments. It may assume the form of a finished product or semi-finished product.

Foods and feeds carry the so-called nutrients which are required by the human body and the animal body for growth and sustenance.

The infinitely large number of foods and feeds, of which diets are made up, only contain the same nutrients. These nutrients are the essential ingredients of any diet. Their presence in an optimal form and quantity provides for a health-sustaining diet of full nutritional value. A diet is of full nutritional value when it covers the energy and protein demand of the organism, i.e. contains sufficient calories and all the necessary nutrients in the correct quantity, in the correct ratio and in a form in which they can be fully utilised.

The nutrients may be divided up into three groups according to their respective functions:

(1) Energy sources are primarily fat and carbohydrates and, in the event of any fat or carbohydrate deficiency, also protein.

(2) Anabolic substances are required for building up new body substance, particularly during growth. The group of anabolic substances includes above all protein and most minerals.

(3) Supplements and regulators are nutrients which do not perform either of the functions mentioned under (1) and (2). However, they are essential to the maintenance of a proper metabolism. Vitamins, minerals and trace elements are included in this group.

A distinction is drawn between minerals, of which the daily demand is of the order of g, and trace elements of which the daily demand is of the order of mg or μg.

Inorganic nutrients are required:

(1) as building elements, for example Ca, P, Fe;
(2) for maintaining osmotic pressure, for example Na, K, Cl;
(3) as constituents or activators of ferments, for example Fe, Mg, Mn, Cu, Mo;
(4) as constituents of vitamins, for example Co;
(5) as constituents or activators of hormones, for example I and Zn and;
(6) for other metabolic functions, for example Cl (stomach acid), Ca (blood coagulation), P (carbohydrate metabolism and energy transfer), F (resistance of the teeth).

Some of the inorganic nutrients required by adults are listed in the following Table:

| Daily inorganic nutrient demand | | | |
|---|---|---|---|
| Calcium | 1.0 g | Copper | 3–6 mg |
| Phosphorus | 1.0 g | Zinc | 10 mg |
| Iron | 12 mg | Manganese | 2–3 mg |
| Sodium chloride | 2–4 g | Fluorine | 1 mg |
| Potassium | 2.0 g | Iodine | 0.1–0.15 mg |

| -continued | |
|---|---|
| Daily inorganic nutrient demand | |
| Magnesium | 0.3 g |

The trace elements which are regularly found in food and in the body may be divided into three groups according to their physiological importance; those whose importance to life has been established (essential trace elements); those which, despite their occasional physiological function (for example F), cannot be definitely regarded as important to life (accidental trace elements); and so-called accompanying elements. Co, Cu, Mn, Zn, I, Si and Mo have proved to be essential to life, whilst Al, As, Cr, Au, F, Ni, Ag, Ti and Sn have proved to be nonessential. B, Br, Sc, Sr and Rh are accompanying elements.

The classification of trace elements varies somewhat. Thus, according to studies conducted by the World Health Organisation, trace elements so far as human beings are concerned are elements which in particular perform catalytic functions in essential enzymatic processes, such as the elements Zn, Mg, Co, Cu, Cr, Sr and Mo. They occur in the human organism in quantities of a few grams (Mg approximately 20 to 25 g, Zn approximately 30 g to a few milligrams and Mo approximately 5 mg).

Any deficiency of trace elements in human beings and animals produces deficiency symptoms. In highly productive animals in particular, despite a diet based on trace elements designed to improve productivity, manifest disturbances occur to an increasing extent, as reflected for example in poorer production, avital responses, performance depression, etc.

Although supplementation using the known, hitherto used, chemically defined trace element salts of compounds of Zn, Fe, Cu, Co, Mn, I etc. with inorganic acids of the elements F, Cl, P etc., does produce specific and positive effects, the administration of salts such as these involves difficulties from the taste point of view whilst the particles of such salts give rise to difficulties in regard to absorption and indigestibility. In addition, it is virtually impossible to achieve balanced supplementation because the trace element/salt mixtures available only contain 6 to 8 trace elements at most.

Another disadvantage attending the use of known trace element/salt mixtures lies in the fact that, when trace element/salt mixtures of this type are added to foods, the trace element salts are capable of entering into reactions with other ingredients of the food. For example, non-ferrous metals, such as cobalt, react with fat. In addition, the metals reduce vitamin activity, etc.

DE-OS No. 29 06 375 describes an animal feed composition of at least one feed and cement-kiln fly ash. The feeds used may be any of the known feeds for animals, such as synthetic foods or natural foods. The cement-kiln fly ash is generally extracted from electrostatic separators in the chimney smoke flaps of cement factories.

Cement kiln fly ash contains hardly any trace elements, but mainly alkalis, calcium and silicon. In the known process therefore, the product obtained is only suitable for animals and is added to solid feeds.

DE-AS No. 20 34 692 describes a process for the production of concentrates of essential trace elements. In this known process, a trace element mixture is added to liquid dairy products in a quantity of from 1 to 8% by weight, based on the lactose-free dry mass of the dairy product used. The disadvantage of these known concentrates is that they only contain the usual 6 to at most 8 trace elements and do not guarantee the supply of all essential trace elements to human beings and animals. In addition, individual trace elements, for example copper sulfate, iron or zinc compounds, rather than mixtures of trace elements are generally used in this known process. The concentrate cannot be directly used as a feed, but instead it is added to feeds.

OBJECT OF THE INVENTION

The object of the present invention is to provide a nutrient of a concentrate which is capable of supplying a wide range of trace elements and, more particularly, more than the hitherto usual 6 to 8 trace elements.

Another object of the present invention is to avoid the limitations introduced by taste into known trace element concentrates and to enable the particle size of the concentrates to be varied in such a way that the indigestibility encountered hitherto is avoided. In addition, the concentrate according to the invention is intended to be readily absorbed by human beings and animals.

The process for producing the concentrate according to the invention is intended to be simple, the concentrate obtained is intended to be easy to handle and to be able to be readily mixed with foods and concetrated feeds in which it is intended to be uniformly distributed. The trace elements are intended to be present in the concentrate according to the invention in such a way that they do not enter into any reactions with the constituents of the food or produce any disturbances in the human organism.

SUMMARY OF THE INVENTION

The present invention relates to a process for the production of a concentrate containing trace elements which is suitable for human beings and animals and which is characterised in that vegetable ash and/or coal residues containing inorganic constituents are added to acid, liquid by-products from the processing of milk containing more than 9% of ash in the dry matter and having a pH-value below 5.5 in a quantity which is sufficient to increase the pH-value, trace elements and/or minerals are optionally added, the enriched, liquid or paste-like product is dried and optionally ground or granulated. Carbohydrates and/or gums may optionally be added after the increase in pH.

The invention also relates to the concentrate obtained by this process and to concentrate containing trace elements which is suitable for human beings and animals and which is characterised in that, based on the dry mass, it contains from 20 to 75 parts by weight of dry matter emanating from a liquid by-product from the processing of milk containing more than 9% of ash in the dry matter,
from 8 to 55 parts by weight of vegetable ash and/or coal residues containing inorganic constituents,
from 0 to 25 parts by weight of a mixture of trace elements,
from 0 to 70 parts by weight of minerals and
from 0 to 15 parts by weight of carbohydrates and/or gums.

The invention also relates to the use of the concentrate according to the invention as a food or feed or as a food or feed supplement.

DETAILED DESCRIPTION OF THE INVENTION

The Applicant has surprisingly found that the above-mentioned disadvantages of known trace element supplements and concentrates can be avoided by adding vegetable ash and/or coal residues containing inorganic constituents to acid by-products rich in minerals from the processing of milk and drying the mixture obtained.

The vegetable ash used in the process according to the invention differs from the cement kiln fly ash used in DE-OS No. 29 06 375 in its alkalinity. As can be seen from the following comparison analyses, cement kiln fly ash contains more than 50% of CaO whilst the vegetable ash used in the process according to the invention contains less than 3% of CaO:

| Comparison of the analyses of cement kiln fly ash and vegetable ash | | |
|---|---|---|
| Constituents | Cement kiln fly ash (%) | Vegetable ash (%) |
| SiO$_2$ | 13.5 | 20.3 |
| Al$_2$O$_3$ | 3.4 | 3.8 |
| Fe$_2$O$_3$ | 3.8 | 1.07 |
| CaO | 52.6 | 2.79 |
| S | 1.1 | - |
| Na$_2$O | 1.6 | 0.674 |
| K$_2$O | 3.3 | 0.843 |

The process according to the invention gives a powder or granulate which is capable of supplying numerous trace elements and virtually all the trace elements required.

Surprisingly, the product according to the invention does not have a bitter taste so that it is readily consumed by human beings and animals. Surprisingly, it has been found that the trace elements present in the concentrate according to the invention do not enter into any reaction with other food constituents.

The particle size of the product according to the invention is such that it is absorbed very easily by human beings and animals, thus avoiding the absorption difficulties attending known concentrates. It is assumed that the ready absorption of the trace elements is attributable to the fact that the trace elements are fixed to the milk by-products.

The process for producing the product according to the invention is easy to carry out and economical. The concentrate according to the invention may be uniformly distributed in any foods and feeds and is also not contaminated by any trace element antagonists.

The vegetable ash used in the process according to the invention emanates from biological organisms. Accordingly, the ash has the advantage that it does not contain any life-inhibiting trace substances, i.e. substances which damage living organisms.

Vegetable ash is used in the process according to the invention. The vegetable ash contains a wide range of trace elements. The vegetable ash used is in particular ash of the type which emanates from geologically relatively old epochs and which accumulates when certain types of coal, for example mineral coal, when burnt under certain conditions, i.e. at temperatures below those at which complete sintering occurs. The usual technical term for vegetable ash of this type is, for example, "mineral-coal fly ash" or more generally "fly ash". Mineral coal fly ash or fly ash has been the subject of numerous studies. It has been shown inter alia that it is harmless to animals even in very large doses (for example 3 kg/day/head of livestock) and may safely be used in feeds.

With the aid of atomic absorption diagrams, it is possible to show that this ash contains almost all the elements of the Periodic System, the surprising feature being that the percentage of harmful substances, for example Pb, Hg, Th, Cd etc., is so low that it is far below the currently fixed limit of tolerability.

Surprisingly however, the vegetable ash in question contains relatively high proportions of trace elements which, hitherto, were either unusual or could not be made available as chemical trace elements, but which are known to perform an obligatory and activating function within important and functional enzyme groups of the type required to an increasing extent for high-productivity animals. This applies in particular to such elements as Ti, Cr, Li, Ba, Br, Ni and elements from the lanthanide group.

The analysis of the vegetable ash as determined by atomic absorption is shown in the following. The individual elements appear in the order in which they occur in the Periodic System, the Groups being referred to in short as Gr and the Periodic Number as Per. In addition, ON in the Table stands for the ordinal number, AW for the atomic weight and ppm for the content in mg/kg.

| Analysis of the vegetable ash | | | | | |
|---|---|---|---|---|---|
| Gr | Per | Element | ON | AW | ppm |
| I | 2 | Lithium | 3 | 6.939 | 42 |
|  | 3 | Sodium | 11 | 22.9898 | 5,000 |
| A | 4 | Potassium | 19 | 39.102 | 7,000 |
|  | 5 | Rubidium | 37 | 85.47 | 140 |
|  | 6 | Caesium | 55 | 132.905 | 20 |
| IB | 4 | Copper | 29 | 63.546 | 200 |
|  | 5 | Silver | 47 | 107.868 | 0.5 |
| II | 2 | Beryllium | 4 | 9.0122 | 8 |
|  | 3 | Magnesium | 12 | 24.312 | 8,000 |
| A | 4 | Calcium | 20 | 40.08 | 20,000 |
|  | 5 | Strontium | 38 | 87.62 | 2,000 |
|  | 6 | Barium | 56 | 137.34 | 2,400 |
| II | 4 | Zinc | 30 | 65.37 | 260 |
| B | 5 | Cadmium | 48 | 112.40 | 0.7 |
|  | 6 | Mercury | 80 | 200.59 | 0.01 |
| III | 2 | Boron | 5 | 10.811 | 230 |
|  | 3 | Aluminium | 13 | 26.9815 | 40,000 |
|  | 4 | Scandium | 21 | 44.956 | 3.7 |
|  | 5 | Yttrium | 39 | 88.905 | 100 |
|  | 6 | Lanthanides |  |  |  |
|  |  | Lanthanum | 57 | 138.91 | 40 |
|  |  | Cerium | 58 | 140.12 | 100 |
|  |  | Praseodymium | 59 | 140.907 | 38 |
|  |  | Neodymium | 60 | 144.24 | 55 |
|  |  | Promethium | 61 | (147) |  |
|  |  | Samarium | 62 | 150.35 | 11 |
|  |  | Europium | 63 | 151.96 | 3 |
|  |  | Gadolinium | 64 | 157.25 | 13 |
|  |  | Terbium | 65 | 158.924 | 2-3 |
|  |  | Dysprosium | 66 | 162.50 | 7 |
|  |  | Holmium | 67 | 164.930 | 1.2 |
|  |  | Erbium | 68 | 167.26 | 3.4 |
|  |  | Thulium | 69 | 168.934 | 3.0 |
|  |  | Ytterbium | 70 | 173.04 | 5.5 |
|  |  | Lutetium | 71 | 174.97 | 0.5 |
| IV | 2 | Carbon | 6 | 12.01115 | 0 |
|  | 3 | Silicon | 14 | 28.086 | 190,000 |
| A | 4 | Titanium | 22 | 47.90 | 1,600 |
|  | 5 | Zirconium | 40 | 91.22 | 300 |
|  | 6 | Hafnium | 72 | 178.49 | 9 |
| B | 4 | Germanium | 32 | 72.59 | 2.4 |
|  | 5 | Tin | 50 | 118.69 | 60 |
|  | 6 | Lead | 82 | 207.19 | 15 |
| V | 2 | Nitrogen | 7 | 14.0067 | 0 |
|  | 3 | Phosphorus | 15 | 30.9783 | 8,000 |
| A | 4 | Vanadium | 23 | 50.942 | 50 |

| -continued | | | | | |
|---|---|---|---|---|---|
| Analysis of the vegetable ash | | | | | |
| Gr | Per | Element | ON | AW | ppm |
|  | 5 | Niobium | 41 | 92.906 | 60 |
|  | 6 | Tantalum | 73 | 180.948 | 0.5 |
| VB | 4 | Arsenic | 33 | 74.9216 | 22 |
|  | 5 | Antimony | 51 | 121.75 | 4.5 |
|  | 6 | Bismuth | 83 | 208.980 | 0.5 |
| VI | 2 | Oxygen | 8 | 16 | 0 |
|  | 3 | Sulfur | 16 | 32.064 | 4,000 |
| A | 4 | Chromium | 24 | 51.996 | 110 |
|  | 5 | Molybdenum | 42 | 95.94 | 36 |
|  | 6 | Tungsten | 74 | 183.85 | 6 |
| VI | 4 | Selenium | 34 | 78.96 | 0.3 |
| B | 5 | Tellurium | 52 | 127.60 | 0.2 |
| VII | 2 | Fluorine | 9 | 18.9984 | 150 |
|  | 3 | Chlorine | 17 | 35.453 | 420 |
| A | 4 | Manganese | 25 | 54.9380 | 400 |
|  | 5 | Technetium | 43 | (99) |  |
|  | 6 | Rhenium | 75 | 186.2 |  |
| VII | 4 | Bromine | 35 | 79.904 | 0.7 |
| B | 5 | Iodine | 53 | 126.9044 | 0.2 |
|  | 6 | Astatine | 85 | (210) |  |
| VIII | 4 | Iron | 26 | 55.847 | 15,000 |
|  |  | Cobalt | 27 | 58.9332 | 7 |
|  |  | Nickel | 28 | 58.71 | 50 |
| VIII | 5 | Ruthenium | 44 | 101.07 |  |
|  |  | Rhodium | 45 | 102.905 |  |
|  |  | Palladium | 46 | 106.4 |  |
| III |  | Actinides |  |  |  |
| A | 7 | Thorium | 90 | 232.038 | 40 |
|  |  | Uranium | 92 | 238.03 | 30 |
| III | 4 | Gallium | 31 | 69.72 | 20 |
| B | 5 | Indium | 49 | 114.82 |  |
|  | 6 | Thallium | 81 | 204.37 | 0.8 |

The vegetable ash is preferably used in dust-like form. Unlike the trace element salts of chemical origin, the vegetable ash shows a neutral reaction. It does not have a metallic taste and is thus particularly favourable both in terms of taste and in terms of particle size. Vegetable ash is generally produced from organic materials and plants.

Residues of the type which accumulate in the treatment of coal and which contain inorganic constituents of coal may be used instead of the vegetable ash in the process according to the invention.

For example, coal dust may be finely ground and subjected to flotation in water. As a result, the coal separates into inorganic and organic constituents. The flotation residue containing the inorganic fractions may also be used in the process according to the invention.

In the interests of simplicity, the expression "fly ash" or "vegetable ash" is also intended in the following to cover coal residues of this type.

Another constituent of the concentrate according to the invention are acid by-products from the processing of milk. Acid by-products from the processing of milk are understood to be milk waste and secondary products which contain special sugars, organic acids and reactive protein compounds and accumulate both as a fraction and as secondary products in the processing of milk. Products of the type in question accumulate for example in the production of lactose and in the electrodialysis of milk and milk products.

It is also possible to use other by-products which are partly deproteinised, but rich in minerals. Other examples are ultrafiltration permeates, electrodialysis waste and strongly acid concentrates from the production of lactose, but not coupling products from the use of ion exchangers. Milk by-products of the type in question have a pH-value below 5.5, preferably in the range from 3.0 to 5.0 and, more preferably, in the range from 3.9 to 7. Milk by-products of the type in question can vary in their dry matter content. However, products containing at least 9% of ash in the dry matter are used in accordance with the invention.

If the fly ash is added to the milk by-product, it is uniformly distributed therein. The quantity of fly ash added may be varied as required, amounting to between 5 and 55 parts by weight, preferably to between 15 and 50 parts by weight and, more preferably, to between 25 and 45 parts by weight, based on dry fly ash and dry mass of the end product.

Addition of the fly ash must be accompanied by intensive stirring. The fly ash is added at room temperature or, if necessary, at a slightly elevated temperature, depending on the form in which the milk by-product accumulates. The reaction temperatures may be in the range from 10° to 50° C. and are preferably in the range from 25° to 45° C. After the fly ash has been added to the milk by-product, the reaction mixture is left standing for a while. A gradual increase in the pH-value is observed. If for example a milk by-product having a starting pH-value of 3.9 is used and fly ash subsequently added, the pH-value soon undergoes an increase to 4.5–5.0–5.5–5.8 to 6.2. Where the ratio by weight of dry mass from the milk by-product to dry mass from the vegetable ash amounts to between 1:3 and 3:1, this process is almost always over after 8 hours and—where a slightly higher temperature (25° to 45° C.) is used—after at most 6 hours.

The fly ash is added in such a quantity that the pH rises to a value above 6.

The above-described milk products, which are used as starting material in accordance with the invention, such as thickened concentrates from the production of lactose, ultrafiltration and electrodialysis, do not show particularly favourable behaviour when subjected to cylinder drying or spray drying. In the spray drying process, they tend to build up troublesome deposits both in the spraying zone and in the cone of the spraying tower. In cylinder drying—apart from the poor drying effect per unit area—the products form typical coils and plastic "rolls" on leaving the blade. Both phenomena ultimately result in the collapse of the drying process. The end products obtained are highly hygroscopic and uneconomical through the difficulties involved in their production.

It has surprisingly been found that the concentrates obtained from milk products mixed with vegetable ash show completely different behaviour when subjected to drying. These reaction products may be dried much more effectively and in much larger quantities than the pure milk by-products. Although, after drying and prolonged storage, they are hygroscopic to a certain extent, they are far less hygroscopic than the product obtained by drying the pure milk by-products.

In one preferred embodiment, carbohydrates and/or gums are added to the mixture of milk by-product and ash. Preferred carbohydrates are potato products, such as potato starch, potato flour, potato flakes, potato peelings or whole potatoes, powdered cereals and by-products of cereals, such as by-products of rice, corn, barley, wheat, oats, rye, millet, waste bread and broken crisp bread, celluloses, such as cellulose and hemi-celluloses. Examples of gums, which in some cases are also referred to as resins, are gum arabic, cherry gum, *Gum Acaroides, Gum Asa goetida, G. Benzoe Siam, G. Copal, G. Elemi, G. Galbanum, G. Guajaci, G. Gutti, G. Kino, G. Mastix, G. Myrrhae, G. Olibanum, G. Opoponax, G. Sandaracae, G. Sanguis Draconis* and *G. Styrax.*

The carbohydrates and/or gums are used as dry matter in a quantity of from 0 to 15 parts by weight and preferably in a quantity of from 3 to 8 parts by weight, based on 100 parts by weight of dry mass.

If carbohydrates and/or gums are used in the process according to the invention, the carbohydrates and/or gums are added after the pH of the mixture of milk by-product and fly ash has stabilised to a constant value. The carbohydrates and/or gums have to be added with stirring at a reaction temperature in the above-mentioned range. If the concentrate according to the invention contains carbohydrates, it is no longer hygroscopic and may be safely stored for long periods.

In this connection, it is preferred to use the smaller fractions in the case of (tower) spray drying and the larger fractions in the case of cylinder drying.

The products according to the invention may be satisfactorily produced by existing dairy techniques. If large quantities of the product according to the invention are to be produced with a high degree of economy, drying has to be carried out on a specially designed cylinder.

In this connection, the dry mass of the mixture of milk by-product, vegetable ash and carbohydrates is adjusted to such a high level that more than 50% of dry matter are obtained in the wet material before drying. The almost plastic wet material obtained after the usual reaction time and after the addition of carbohydrate is delivered by a pump specially designed for thick materials and a linear application unit to a drying cylinder on which are arranged several application rollers each supplied with its own stream of wet material. A thick coating may be applied in this way. Basically, this is done from the middle point of the drying cylinder, as seen vertically from above. The blade is arranged in such a way that, as seen from the centre of the cylinder, it is situated vertically below either horizontally adjacent or in the vicinity of the lower point and is thus able effectively to remove the compact film.

The dry material leaving the cylinder may subsequently be size-reduced, granulated or finely ground in a mill in known manner.

Where a milk by-product, vegetable ash and carbohydrates and/or gums are used in the process according to the invention, the products mainly obtained are semi-finished products which are particularly suitable for ensuring the supply of trace elements to human beings and animals.

If it is assumed that performance-related animal diets require special, quantitatively larger additions of individual trace elements than can be provided by the vegetable ash, it is necessary specifically to introduce these individual trace elements in the form of chemical salts.

One or more trace elements is/are added during the reaction between the milk by-product and the vegetable ash and before the carbohydrates are added. The trace element may be added in the form of a salt, oxide or hydroxide. It is of course also possible to use mixtures of different salts or an oxide of a trace element or similar compounds or mixtures of salts, oxides or hydroxides or similar compounds of various trace elements. In the process according to the invention, minerals such as any standard commercial mineral components, for example calcium carbonate, dicalcium carbonate and the like (cf. also "Handbuch der Futtermittel" M. Becker, K. Nehring, Verl. P. Parey, Hamburg and Berlin 1967, 3rd Vol., page 312) may be used in addition to the mixtures of trace elements. If for example it is intended to produce concentrates suitable for pigs, the concentrates in question should contain relatively large quantities of copper sulfate so that, through the semi-finished product obtained by the process according to the invention, a controlled dosage of approximately 125 ppm of copper in the form of copper sulfate may be obtained in the pigs fodder. Similar products are suitable for example for turkeys, layer hens or broiler chicks, for sheep and cattle which require preliminary mixtures of other, specially metered trace elements.

Products of the type obtained by the additional introduction of trace elements are also suitable for supplying human beings and animals with macrominerals.

Mixtures according to the invention which are present in powder form and which contain additional trace element salts in addition to the trace elements emanating from the fly ash may be used with advantage for any application where—in the case of special premixes for certain types of animal and production groups—high dosages of certain trace elements and trace element compounds are required, for example for milk cattle, sheep, layer hens, turkeys, but especially for fattened pigs in whose case it is known that from 135 to 250 ppm of copper sulfate in the diet provides for improved protein utilisation, and on the other hand also for human nutrition when certain requirements have to be satisfied.

The concentrates according to the invention may of course contain standard additives, such as vitamins, preservatives or antibiotics, ferments, hormones, pharmaceuticals, etc. (cf. the Chapter entitled "Futtermittel" in Vol. 12 of Ullmanns Enzyklopadie der Technischen Chemie, page 41, 1976).

A preferred feed according to the invention contains (based on 100 parts by weight of dry mass)

from 20 to 75 parts by weight of dry matter emanating from a liquid milk by-product containing more than 9% of ash in the dry matter, from 8 to 55 parts by weight of vegetable ash and/or coal residues containing inorganic constituents, from 0 to 25 parts by weight of a mixture of trace elements, from 0 to 70 parts by weight of minerals and from 0 to 15 parts by weight of carbohydrates and/or gums.

The contents of the various trace elements in a concentrate according to the invention and the ingredients are shown in the following.

A preferred concentrate according to the invention was prepared from 50% of dry mass emanating from whey protein concentrate and 50% of dry mass emanating from fly ash.

The concentrate has the following composition:

| Composition of the concentrate | | | |
|---|---|---|---|
| Whey protein concentrate | 50% DM | 48–49% prod. | |
| Fly ash | 50% DM | 48–49% prod. | |
| | | 4.2% residual moisture | |
| End product | 100% DM | 100% | |
| Ingredients (calculated) | | | |
| | % in the product | ppm from the whey | ppm from the fly ash | ppm in the product |
| Crude protein | 10–11 | | | |
| Lactose | 20–25 | | | |
| Milk minerals | 12–15 | | | |

| | | | | |
|---|---|---|---|---|
| Powdered fly ash | 47–49 | | | |
| Calcium | 3–4 | | | |
| Potassium | 6–7 | | | |
| Sodium | 2–2.5 | | | |
| Magnesium | 0.5–0.6 | | | |
| Phosphorus | 0.8–0.9 | | | |
| Sulfur | | 2,000 | 2,000 = | 4,000 |
| Silicon | | 54 | 95,000 = | 95,000 |
| Aluminium | | 8 | 20,000 = | 20,000 |
| Titanium | | ? | 800 = | 800 |
| Vanadium | | ? | 25 = | 25 |
| Chromium | | 110 | 55 = | 150 |
| Manganese | | 0.7 | 200 = | 200 |
| Iron | | 5 | 7,500 = | 7,500 |
| Cobalt | | 10 | 3 = | 13 |
| Nickel | | 20 | 25 = | 45 |
| Copper | | 1.5 | 100 = | 100 |
| Zinc | | 28 | 130 = | 150 |
| Arsenic | | | 22 = | 11 |
| Selenium | | | 0.2 = | 0.2 |
| Bromine | | | 0.3 = | 0.3 |
| Molybdenum | | 0.5 | 18 = | 18 |
| Lanthanides | | ? | 140 = | 140 |

The product is a dark-grey, finely distributed powder obtained by spray drying.

The described process provides completely new, hitherto unusual combination products of (a) vegetable ash as a carrier of various trace elements;

(b) milk by-products which are characterised by their acid pH and by a mineral content exceeding the usual content, for example of skimmed milk with 7% of ash in the dry matter or whey with 8 to 9% of ash in the dry matter;

(c) optionally, additionally introduced trace element salts and/or mineral components for supplementing and increasing ingredients (a) and (b); and (d) carbohydrates as a technical aid for reducing minimal, but possible hygroscopicity in the event of prolonged storage.

In animal tests, the products proved to be successful and suitable for eliminating hitherto possible deficiency symptoms, particularly in the case of productivity disturbances, avitality of yound animals, unsymptomatic failures and general, undefinable depressions in growth and productivity in high-productivity animals.

In human nutrition, the products may be used in cases where unbalanced diets and overfeeding lead to illnesses which may be traced back to unexplainable deficiency situations so that the diet has to be completed by trace elements and absorption promoting factors.

The invention is illustrated and in no way limited by the following Examples.

EXAMPLE 1

In the following, the constituents are used in such a way that 100 kg of dry matter (DM) are obtained.

| Process | DM-kg | Product/raw material | Weight-kg |
|---|---|---|---|
| Initial input | 46 | milk by-product, thickened, ∅ 35% | 131.43 |
| Addition | 46 | vegetable ash, powdered | 48.42 |
| Homogeneous mixing, reaction time pH-controlled emptying | | | |
| Addition | 8 | Potato flakes as carbohydrate | 8.89 |
| | 100 | Mix = wet material Dry mass/wet material = 53% | 188.74 |

This is followed by final drying (cylinder/tower) and, optionally, by ultra-fine grinding.

Where drying is carried out in dryers of the type hitherto commonly used for milk products, it has been found that the mix produced in accordance with the invention empties more readily by comparison with drying of the milk by-products on their own, even when throughput is based solely on the milk fractions.

In spray drying, throughput based on the milk product is improved by around 10 to 15% per unit—a surprising effect which favourably affects both economy and also energy consumption.

If by contrast the special cylinder arrangement described in the foregoing is used, a considerable increase in performance of more than 50% is obtained, based on the throughput of milk product (kg/m$^2$/h), so that a particularly economical and energy-saving effect is obtained.

EXAMPLE 2

The quantities used are based in each case on 100 kg of dry matter.

| Process | DM-kg | Product/raw material | Weight-kg |
|---|---|---|---|
| Initial input | 46 | milk by-product, thickened, ∅ 35% | 131.42 |
| Addition | 25 | vegetable ash, powdered | 26.32 |
| later | 21 | trace element salts | 23.33 |
| Homogeneous mixing, reaction time pH-controlled emptying | | | |
| Addition | 8 | wheat flour | 8.89 |
| | 100 | Mix = wet material Dry mass/wet material = 53% | 189.96 |

The following technical process takes place in the same way as in Example 1. A trace element premix is obtained which, in addition to the broad range of trace elements of vegetable ash, contains specific amounts of one or more trace elements.

EXAMPLE 3

The quantities used are based in each case on 100 kg of dry matter.

| Process | DM-kg | Product/raw material | Weight-kg |
|---|---|---|---|
| Initial input | 46 | milk product, thickened ∅ 35% | 131.43 |
| Addition | 46 | vegetable ash, powdered or vegetable ash and trace element salt, acid-soluble (According to Example 2) | 48.42 |
| Homogeneous mixing, reaction time pH-controlled emptying | | | |
| Addition | 8 | tapioca | 8.89 |
| | 100 | Total quantity = wet material Dry mass/wet material = 53% | 188.74 |

EXAMPLE 4

The procedure is as described in Example 1, except that 1000 kg of dry substance are produced.

| Process | DM-kg | Product/raw material | Weight-kg |
|---|---|---|---|
| Initial input 1 | 100 | | 188.74 |
| Addition | 400 | milk product, thickened ∅ 35% | 1142.86 |
| Addition | 500 | minerals, components, powdered Na and/or Ca and/or Mg phosphate K and/or Ca carbonate Ca and/or Mg chloride | 555.56 |
| Homogeneous mixing, reaction time pH-controlled, emptying | | | emptying |
| | 1000 | Mix = wet material Dry mass/wet material = 53% | 1887.16 |

The subsequent drying process, optionally followed by grinding, takes place in the same way as in Example 1. A dry trace element mixture is obtained which, in addition to the broad range of trace elements of vegetable ash, contains specific amounts of one or more trace element salts.

EXAMPLE 5

The quantities used are based in each case on 100 kg of dry matter.

| Process | DM-kg | Product/raw material | Weight-kg |
|---|---|---|---|
| Initial input | 40 | milk product, thickened ∅ 35% | 114.29 |
| Addition A | 8 | vegetable ash, powder form or vegetable ash + trace element salts | 8.89 |
| Homogeneous mixing, but short reaction time | | | |
| Addition B | 50 | mineral components, dry, finely ground | 55.55 |
| Homogeneous mixing, reaction time pH-controlled emptying | | | |
| Addition C | 2 | guar gum | 2.10 |
| | 100 | Mix = wet material Dry mass/wet material = 55–56% | 180.63 |

This wet material may also be dried with considerable advantage using traditional milk dryers, spray dryers and cylinder dryers. Where spray dryers are used, dust-like end products are formed which, as mineral and trace element premixes with a broad range of trace elements through vegetable ash, may be introduced as component into human and animal nutrition products.

In cylinder drying, a compact film is initially formed on leaving the blade, particularly where the improved cylinder mentioned above is used. In this case, it is best not ground, but instead administered in flake form and as a supplement to the usual diet of human beings and animals.

I claim:

1. A process for the production of a concentrate containing trace elements suitable for human beings and animals consisting essentially of the steps of adding, with intensive agitation, at a temperature in the range of from 10° C. to 50° C., vegetable ash containing inorganic constituents in a quantity between 8 and 55 parts, based on 100 parts by weight of the resulting dry concentrate, to 20 to 75 parts, based on the 100 parts by weight of the resulting dry concentrate, of an acid liquid milk by-product containing more than 9% ash in the dry state, said addition and agitation being sufficient to uniformly distribute said vegetable ash and increase the pH of the product to a value above 6, adding at least one carbohydrate or gum with agitation and drying the resulting enriched liquid or paste-form concentrate.

2. The process of claim 1 wherein the carbohydrate is at least one potato carbohydrate, cereal flour or cellulose carbohydrate.

3. The process of claim 1 in which the quantity of ash or residue added is between 15 and 50 parts.

4. The process of claim 3 wherein the amount of acid, liquid milk by-product is used in a quantity so that the by-product is from 20 to 75 parts by weight of dry matter based on 100 parts by weight dry mass of the concentrate.

5. The process of claim 4 wherein at least one trace element or mineral is added after the pH value and been increased and before drying.

6. The process of claim 4 wherein the dried product is ground.

* * * * *